United States Patent
Nishikawa et al.

(10) Patent No.: US 11,838,463 B2
(45) Date of Patent: Dec. 5, 2023

(54) PRINTING APPARATUS AND METHOD FOR CONTROLLING PRINTING APPARATUS

(71) Applicant: BROTHER KOGYO KABUSHIKI KAISHA, Nagoya (JP)

(72) Inventors: Yasuo Nishikawa, Nagoya (JP); Takuya Tsuji, Chiryu (JP); Hiroaki Takahashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/587,076

(22) Filed: Jan. 28, 2022

(65) Prior Publication Data
US 2022/0247882 A1   Aug. 4, 2022

(30) Foreign Application Priority Data
Jan. 29, 2021   (JP) ................. 2021-013967

(51) Int. Cl.
*H04N 1/00*   (2006.01)
*G06K 15/00*   (2006.01)
*G06K 15/16*   (2006.01)

(52) U.S. Cl.
CPC ......... *H04N 1/00525* (2013.01); *G06K 15/16* (2013.01); *G06K 15/403* (2013.01); *H04N 1/00602* (2013.01); *H04N 1/00639* (2013.01); *H04N 1/00644* (2013.01); *H04N 1/00702* (2013.01); *H04N 1/00713* (2013.01);
(Continued)

(58) Field of Classification Search
None
See application file for complete search history.

(56) References Cited

U.S. PATENT DOCUMENTS

| | | | | |
|---|---|---|---|---|
| 2012/0249713 A1* | 10/2012 | Sato | ...................... | B65H 35/06 347/171 |
| 2013/0242316 A1* | 9/2013 | Iwata | .................. | G06K 15/022 358/1.5 |

(Continued)

FOREIGN PATENT DOCUMENTS

| JP | 2004306304 A | * 11/2004 |
|---|---|---|
| JP | 2018-186448 A | 11/2018 |

OTHER PUBLICATIONS

JP-2004306304-A English Translation, Figs 1, 2, par 0014-0017, 0021-0030 (Year: 2004).*

*Primary Examiner* — Miya J Cato
(74) *Attorney, Agent, or Firm* — Merchant & Gould P.C.

(57) ABSTRACT

A printing apparatus includes: a conveyor; an image recording device configured to record an image on a printing medium conveyed in a conveyance direction by the conveyor; a divider provided downstream of the image recording device in the conveyance direction and configured to divide the printing medium; a detector provided upstream of the divider in the conveyance direction and configured to detect a trailing end portion of the printing medium; and a controller causing the printing apparatus to: calculate a dividing position of the printing medium based on a length of the printing medium that is grasped by detecting the trailing end portion by the detector; convey the printing medium in a reverse direction by the conveyor to move the dividing position to a position of the divider; and divide the printing medium at the dividing position by the divider.

20 Claims, 10 Drawing Sheets

(52) U.S. Cl.
CPC ..... *H04N 1/00745* (2013.01); *H04N 1/00774* (2013.01); *H04N 2201/0094* (2013.01)

(56) References Cited

U.S. PATENT DOCUMENTS

2022/0242147 A1\* 8/2022 Takahashi ................ B41J 11/70
2022/0242149 A1\* 8/2022 Takahashi ................ B41J 29/38

\* cited by examiner

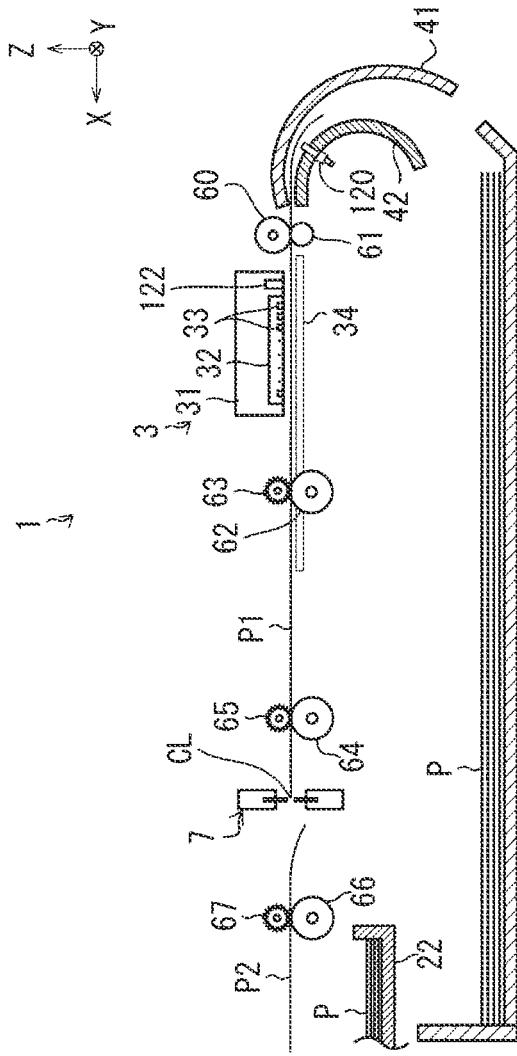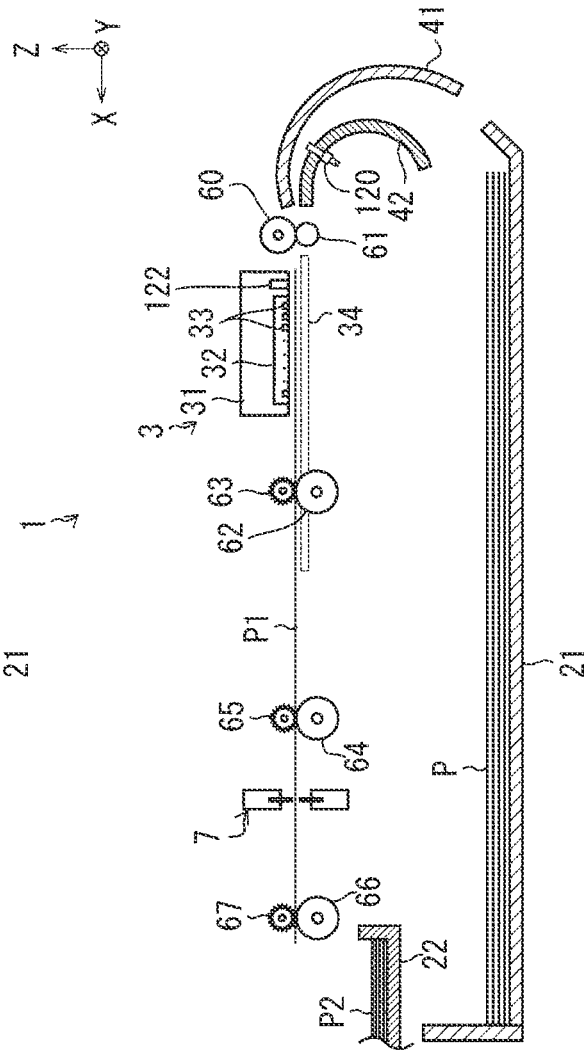

PRINTING APPARATUS AND METHOD FOR CONTROLLING PRINTING APPARATUS

CROSS-REFERENCE TO RELATED APPLICATIONS

This application is based on and claims priority under 35 USC 119 from Japanese Patent Application No. 2021-013967 filed on Jan. 29, 2021, the contents of which are incorporated herein by reference.

TECHNICAL FIELD

The present disclosure relates to a printing apparatus and a method for controlling a printing apparatus.

BACKGROUND

A related-art image forming device includes a cutter that cuts a sheet being conveyed for printing. In the related-art image forming device, an image is formed on one sheet, then the sheet on which the image is formed is cut by a sheet cutter to generate two sheets, and the generated two sheets are discharged to a discharge tray.

SUMMARY

A printing apparatus according to one aspect of the present disclosure includes: a conveyor configured to convey a printing medium; an image recording device configured to record an image on the printing medium conveyed in a conveyance direction by the conveyor; a divider provided downstream of the image recording device in the conveyance direction, the divider being configured to divide the printing medium having the image recorded thereon by the image recording device and being conveyed by the conveyor; a detector provided upstream of the divider in the conveyance direction, the detector being configured to detect a trailing end portion of the printing medium; and a controller configured to cause the printing apparatus to: calculate a dividing position of the printing medium based on a length of the printing medium, the length of the printing medium being grasped by detecting the trailing end portion by the detector; after the calculating, convey the printing medium in a reverse direction by the conveyor to move the dividing position to a position of the divider, the reverse direction being opposite to the conveyance direction by the conveyor; and after the conveying, divide the printing medium at the dividing position by the divider.

A printing apparatus according to another aspect of the present disclosure includes: a conveyor configured to convey a printing medium; an image recording device configured to record an image on the printing medium conveyed in a conveyance direction by the conveyor; a machining device provided downstream of the image recording device in the conveyance direction, the machining device being configured to perform one of (i) cutting, (ii) perforation forming, and (iii) fold forming on the printing medium having the image recorded thereon by the image recording device and being conveyed by the conveyor; a detector provided upstream of the machining device in the conveyance direction, the detector being configured to detect a trailing end portion of the printing medium; and a controller configured to cause the printing apparatus to: calculate a machining position of the printing medium based on a length of the printing medium, the length of the printing medium being grasped by detecting the trailing end portion by the detector; after the calculating, convey the printing medium in a reverse direction by the conveyor to move the machining position to a position of the machining device, the reverse direction being opposite to the conveyance direction by the conveyor; and after the conveying, perform one of the (i) cutting, (ii) perforation forming, and (iii) fold forming on the printing medium at the machining position on the printing medium by the machining device.

A method for controlling a printing apparatus according to one aspect of the present disclosure is a method for controlling a printing apparatus, the printing apparatus including: a conveyor configured to convey a printing medium; an image recording device configured to record an image on the printing medium conveyed in a conveyance direction by the conveyor; a divider provided downstream of the image recording device in the conveyance direction, the divider being configured to divide the printing medium having the image recorded thereon by the image recording device and being conveyed by the conveyor; a detector provided upstream of the divider in the conveyance direction, the detector being configured to detect a trailing end portion of the printing medium; and a controller, the method including: calculating a dividing position of the printing medium based on a length of the printing medium, the length of the printing medium being grasped by detecting the trailing end portion by the detector; after the calculating, conveying the printing medium in a reverse direction by the conveyor to move the dividing position to a position of the divider; and after the conveying, dividing the printing medium at the dividing position by the divider.

A method for controlling a printing apparatus according to another aspect of the present disclosure is a method for controlling a printing apparatus, the printing apparatus including: a conveyor configured to convey a printing medium; an image recording device configured to record an image on the printing medium conveyed in a conveyance direction by the conveyor; a machining device provided downstream of the image recording device in the conveyance direction, the machining device being configured to perform one of (i) cutting, (ii) perforation forming, and (iii) fold forming on the printing medium having the image recorded thereon by the image recording device and being conveyed by the conveyor; a detector provided upstream of the machining device in the conveyance direction, the detector being configured to detect a trailing end portion of the printing medium; and a controller, the method including: calculating a machining position of the printing medium based on a length of the printing medium, the length of the printing medium being grasped by detecting the trailing end portion by the detector; after the calculating, conveying the printing medium in a reverse direction by the conveyor to move the machining position to a position of the machining device, the reverse direction being opposite to the conveyance direction; and after the conveying, performing one of the (i) cutting, (ii) perforation forming, and (iii) fold forming on the printing medium at the machining position on the printing medium by the machining device.

According thereto, a size of the printing apparatus can be reduced.

BRIEF DESCRIPTION OF DRAWINGS

Illustrative embodiments of the disclosure will be described in detail based on the following figures, wherein:

FIGS. 5A and 5B are views showing states in which the sheet is cut in the printing apparatus shown in FIGS. 1 and 2;

DETAILED DESCRIPTION

In the above-described related-art image forming device, since the sheet on which the image is formed is cut by the sheet cutter, it is necessary to form the image on the sheet and ensure a space necessary for cutting the sheet in the image forming device. Therefore, there is a problem that a size of the image forming device is increased. The present disclosure has been made in view of the above problems, and an object thereof is to reduce a size of a printing apparatus.

First Illustrative Embodiment

{Configuration of Printing Apparatus}

Figure 1:
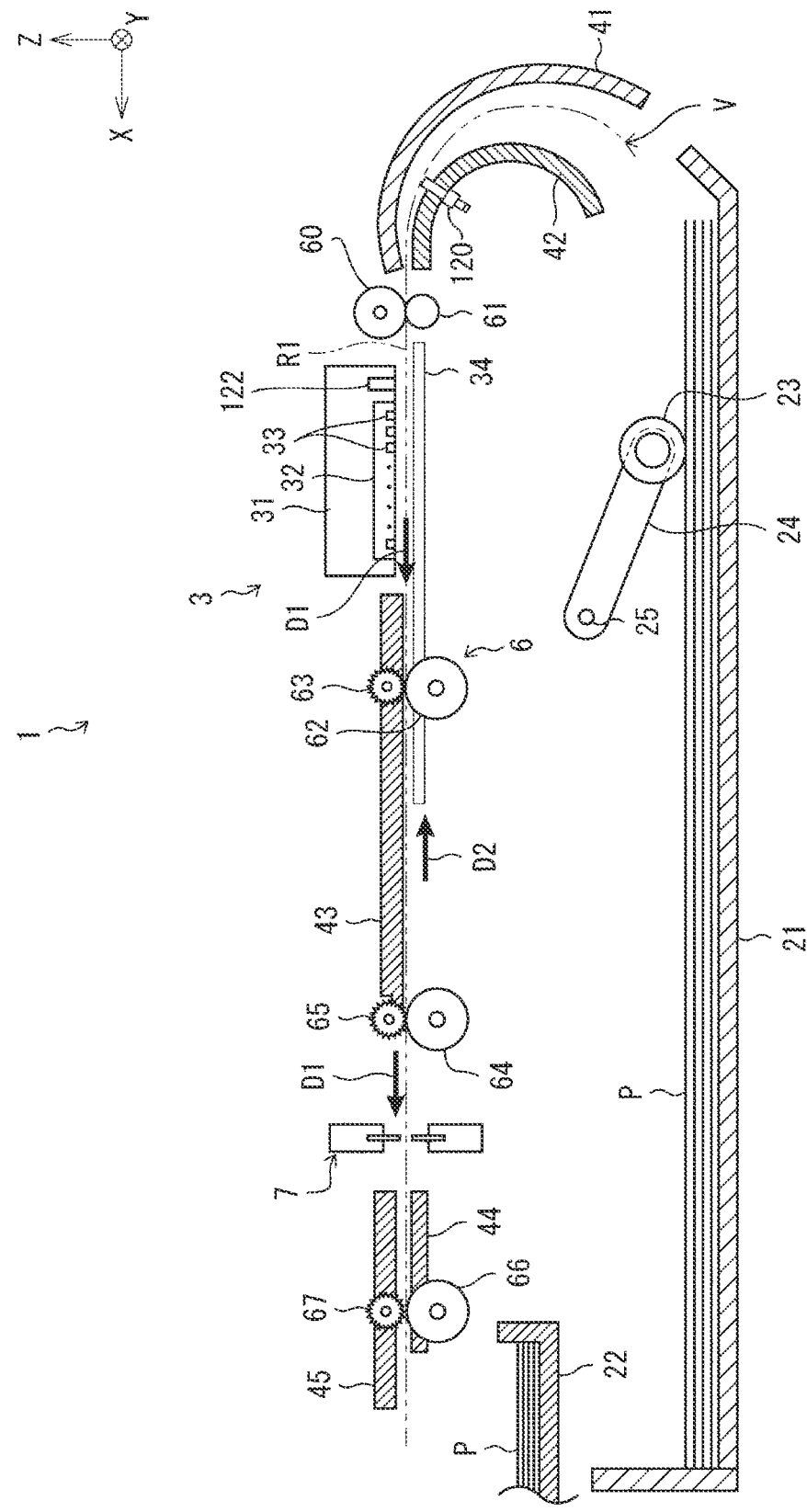
FIG. 1 is a cross-sectional view showing an internal structure of a printing apparatus according to a first illustrative embodiment of the present disclosure.

FIG. 1 is a cross-sectional view showing an internal structure of a printing apparatus 1 according to a first illustrative embodiment of the present disclosure. The printing apparatus 1 is a multi-function peripheral (MFP) having a plurality of functions such as a printing function, a scanning function, a copying function and a fax function. In FIG. 1, a direction from an image recording device 3 toward a cutter 7 serving as an example of a divider is referred to as an X direction, a direction from a feed tray 21 toward the image recording device 3 is referred to as a Z direction, and a direction orthogonal to both the X direction and the Z direction is referred to as a Y direction.

The printing apparatus 1 has a printing function of an inkjet system that prints printing data designated by a printing job on a sheet P serving as an example of a printing medium, by ejecting ink, for example. The printing apparatus 1 may be capable of color printing or may be dedicated to monochrome printing. The printing medium is not limited to a paper medium, and may be a resin medium such as a transparency sheet.

As shown in FIG. 1, the printing apparatus 1 includes the feed tray 21, a discharge tray 22, the image recording device 3, guide members 41 to 45, a conveyance path R1, a conveyor 6, a cutter 7, a registration sensor 120, and a media sensor 122.

The feed tray 21 is a tray for storing a plurality of sheets P, and an upper surface of the feed tray 21 is open. The discharge tray 22 is disposed above the feed tray 21. The discharge tray 22 is a tray for accommodating the sheets P discharged by a conveyance roller 66, and an upper surface of the discharge tray 22 is open.

Figure 2:
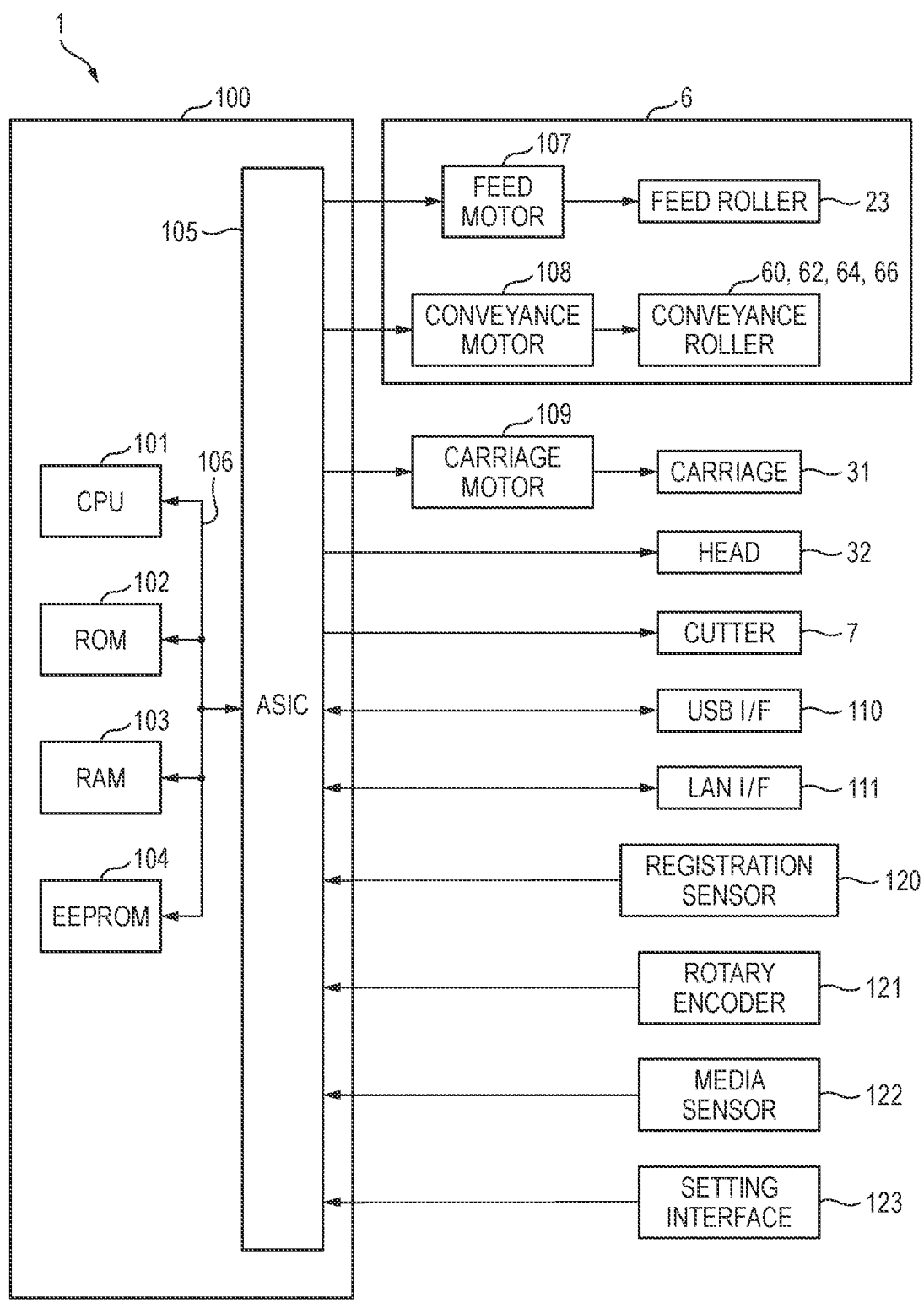
FIG. 2 is a block diagram showing an electrical configuration of the printing apparatus shown in FIG. 1.

Here, the conveyor 6 includes a feed roller 23, conveyance rollers 60, 62, 64 and 66, a pinch roller 61, spur rollers 63, 65 and 67, a feed motor 107, and a conveyance motor 108. The feed motor 107 and the conveyance motor 108 are shown in FIG. 2. The number of rollers provided in the conveyance path R1 may be changed as appropriate, and for example, the conveyance roller 66 and the spur roller 67 may not be provided.

The feed roller 23 is a roller for feeding the sheet P accommodated in the feed tray 21 to a conveyance start position V of the conveyance path R1. The feed roller 23 is rotatably supported by a distal end portion of a feed arm 24. The feed arm 24 is rotatably supported by a shaft 25 supported by a frame of the printing apparatus 1. The feed roller 23 rotates forward due to driving of the feed motor 107. When the feed roller 23 rotates forward, the sheets P accommodated in the feed tray 21 are fed one by one to the conveyance start position V of the conveyance path R1.

The conveyance path R1 extends upward from a rear end portion of the feed tray 21, is curved in an area defined by the guide members 41 and 42, passes through a position of the image recording device 3, extends linearly in an area defined by the guide members 43, 44 and 45, and reaches the discharge tray 22. A conveyance direction D1 is a direction from the feed tray 21 toward the cutter 7 via the image recording device 3 in the conveyance path R1.

The conveyance roller 60 is provided upstream of the image recording device 3 in the conveyance direction D1 in the conveyance path R1. The pinch roller 61 is provided at a position facing a lower portion of the conveyance roller 60. The conveyance roller 60 and the pinch roller 61 configure a conveyance roller pair. The conveyance roller 60 is driven by the conveyance motor 108. The pinch roller 61 rotates in accordance with rotation of the conveyance roller 60. When the conveyance roller 60 and the pinch roller 61 rotate forward, the sheet P is nipped between the conveyance roller 60 and the pinch roller 61 and conveyed to the image recording device 3.

The image recording device 3 is provided between the conveyance roller 60 and the conveyance roller 62 in the conveyance path R1. The image recording device 3 records an image on the sheet P conveyed in the conveyance direction D1 by the conveyor 6. The image recording device 3 includes a carriage 31, a head 32, nozzles 33, and a platen 34. The head 32 is mounted on the carriage 31. The plurality of nozzles 33 are provided on a lower surface of the head 32. The head 32 ejects ink from the nozzles 33. The platen 34 is a rectangular plate-shaped member on which the sheet P is placed. In a process in which the carriage 31 moves with respect to the sheet P supported by the platen 34, the nozzles 33 selectively eject ink, whereby the image is recorded on the sheet P.

The carriage 31 reciprocates in the Y direction, that is, in a width direction of the sheet P due to transmission of a driving force of a carriage motor 109 shown in FIG. 2. A controller 100 shown in FIG. 2 causes the nozzles 33 to eject the ink while moving the carriage 31 in the width direction of the sheet P in a state in which conveyance of the sheet P is temporarily stopped, and records an image of one line on the sheet P. In addition, the controller 100 causes the conveyor 6 to convey the sheet P by a predetermined conveyance amount. The controller 100 records the image on the sheet P by repeating these pieces of processing.

The conveyance roller 62 is provided downstream of the image recording device 3 in the conveyance direction D1 in the conveyance path R1. The spur roller 63 is provided at a position facing an upper portion of the conveyance roller 62. The conveyance roller 62 and the spur roller 63 configure a conveyance roller pair. The conveyance roller 62 is driven by the conveyance motor 108. The spur roller 63 rotates in accordance with rotation of the conveyance roller 62. When the conveyance roller 62 and the spur roller 63 rotate forward, the sheet P is nipped between the conveyance roller 62 and the spur roller 63 and conveyed downstream in the conveyance direction D1.

The conveyance roller 64 is provided downstream of the conveyance roller 62 in the conveyance direction D1 in the conveyance path R1. The spur roller 65 is provided at a position facing an upper portion of the conveyance roller 64. The conveyance roller 64 and the spur roller 65 configure a conveyance roller pair. The conveyance roller 64 is driven by the conveyance motor 108. The spur roller 65 rotates in accordance with rotation of the conveyance roller 64. When the conveyance roller 64 and the spur roller 65 rotate forward, the sheet P is nipped between the conveyance roller 64 and the spur roller 65 and conveyed to the cutter 7.

The cutter 7 is provided between the conveyance roller 64 and the conveyance roller 66 in the conveyance path R1. That is, the cutter 7 is provided downstream of the image recording device 3 in the conveyance direction D1. The cutter 7 cuts the sheet P on which the image is recorded by the image recording device 3 and that is conveyed by the conveyor 6.

Specifically, the cutter 7 is a known cutter mechanism, includes a pair of upper and lower blades and a cutter carriage, and cuts the sheet P by the pair of upper and lower blades. Specifically, the cutter 7 moves the cutter carriage in the width direction of the sheet P to cut a cutting position CL, serving as an example of a dividing position of the sheet P, in the width direction by the pair of upper and lower blades. The cutting position CL is shown in FIG. 5A.

Each of the pair of upper and lower blades is a round blade having a circular shape. In this case, the pair of upper and lower round blades are both provided on the cutter carriage. One of the pair of upper and lower blades may be a fixed blade, and the other of the pair of upper and lower blades may be a round blade. In this case, the round blade is provided on the cutter carriage, and the fixed blade is fixed to the frame of the printing apparatus 1.

The cutter 7 may not include the cutter carriage. In this case, the cutter 7 has fixed blades extending in the Y direction on an upper side and a lower side of the conveyance path R1. The cutter 7 cuts the cutting position CL of the sheet P in the width direction by moving the upper fixed blade and the lower fixed blade such that the upper fixed blade and the lower fixed blade approach each other. The cutter 7 may include only one of the upper and lower blades.

The conveyance roller 66 is provided downstream of the cutter 7 in the conveyance direction D1 in the conveyance path R1. The spur roller 67 is provided at a position facing an upper portion of the conveyance roller 66. The conveyance roller 66 and the spur roller 67 configure a conveyance roller pair. The conveyance roller 66 is driven by the conveyance motor 108. The spur roller 67 rotates in accordance with rotation of the conveyance roller 66. When the conveyance roller 66 and the spur roller 67 rotate forward, the sheet P is nipped between the conveyance roller 66 and the spur roller 67 and discharged to the discharge tray 22.

Figure 4A:
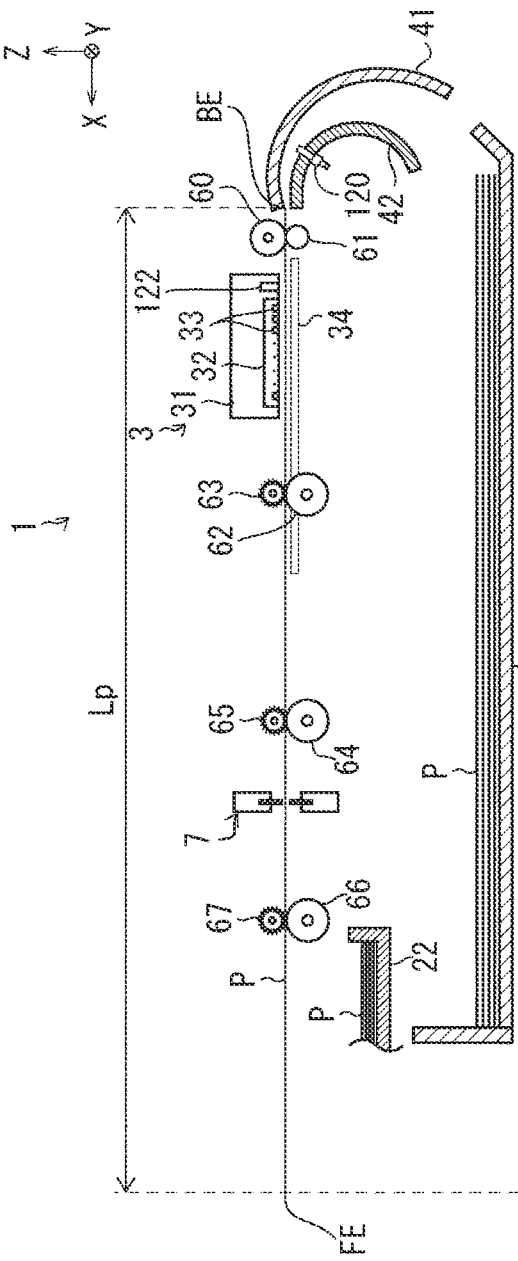
FIGS. 4A and 4B are views showing states of conveyance of a sheet in the printing apparatus shown in FIGS. 1 and 2.

The registration sensor 120 serving as an example of a detector is provided on upstream of the conveyance roller 60 in the conveyance direction D1 in the conveyance path R1. The registration sensor 120 detects a leading end portion FE and a trailing end portion BE of the sheet P conveyed to the conveyance path R1. The leading end portion FE and the trailing end portion BE of the sheet P are shown in FIG. 4A. A sensor, an optical sensor or the like having an actuator that swings when the sheet P comes into contact may be used as the registration sensor 120.

The registration sensor 120 outputs an ON signal in a state in which the sheet P passes through a position of the registration sensor 120, and outputs an OFF signal in a state in which the sheet P does not pass through the position of the registration sensor 120. That is, the registration sensor 120 outputs the ON signal from a timing when the leading end portion FE of the sheet P reaches the position of the registration sensor 120 until the trailing end portion BE of the sheet P passes through the position of the registration sensor 120, and outputs the OFF signal in the other periods. A detection signal from the registration sensor 120 is output to the controller 100.

The conveyance roller 60 is provided with a rotary encoder 121 that detects the rotation of the conveyance roller 60. The rotary encoder 121 shown in FIG. 2 outputs a pulse signal to the controller 100 according to the rotation of the conveyance roller 60. The rotary encoder 121 includes an encoder disk and an optical sensor. The encoder disk rotates with the rotation of the conveyance roller 60. The optical sensor reads the rotating encoder disk to generate a pulse signal, and outputs the generated pulse signal to the controller 100.

The image recording device 3 is provided with a media sensor 122 serving as an example of a detector. The media sensor 122 is a sensor for detecting whether the sheet P is present on the platen 34. The media sensor 122 is used to detect that the leading end portion FE of the sheet P conveyed to the conveyance path R1 reaches the image recording device 3. Instead of the registration sensor 120, the media sensor 122 may detect both the leading end portion FE and the trailing end portion BE of the sheet P.

{Electrical Configuration of Printing Apparatus}

FIG. 2 is a block diagram showing an electrical configuration of the printing apparatus 1 shown in FIG. 1. As shown in FIG. 2, the printing apparatus 1 includes the controller 100, the carriage motor 109, a USB interface (I/F) 110, a LAN interface (I/F) 111, the rotary encoder 121, and a setting interface 123, in addition to the elements described above.

The controller 100 includes a central processing unit (CPU) 101, a read only memory (ROM) 102, a random access memory (RAM) 103, an EEPROM 104 (registered trademark), and an ASIC 105. These components are connected by an internal bus 106.

The ROM 102 stores programs and the like for the CPU 101 to control various operations. The RAM 103 is used as a storage area for temporarily storing data, signals and the like used when the CPU 101 executes the programs, or as a work area for data processing. The EEPROM 104 stores, for example, standard lengths of a plurality of types of sheets P. The controller 100 controls the feed motor 107, the conveyance motor 108, the carriage motor 109, the head 32, the cutter 7 and the like based on a control program read from the ROM 102.

The ASIC 105 is connected to the feed motor 107, the conveyance motor 108, the carriage motor 109, the head 32, the cutter 7, the USB interface 110, the LAN interface 111, the registration sensor 120, the rotary encoder 121, the media sensor 122, and the setting interface 123.

The ASIC 105 supplies a drive current to the feed motor 107, the conveyance motor 108, and the carriage motor 109. The controller 100 controls rotation of the feed motor 107, the conveyance motor 108, and the carriage motor 109 by, for example, pulse width modulation (PWM) control.

The controller 100 applies a drive voltage to a vibration element of the head 32, thereby causing the nozzles 33 to eject the ink. The controller 100 detects a state of the printing apparatus 1 based on signals output from the registration sensor 120, the rotary encoder 121, and the media sensor 122.

A universal serial bus (USB) memory, a USB cable and the like are connected to the USB interface 110. A personal computer (PC) is connected to the LAN interface 111 via a local area network (LAN) cable. When the controller 100 receives a printing job via the USB interface 110 or the LAN interface 111, the controller 100 controls the elements of the printing apparatus 1 to record an image of printing data designated by the printing job on the sheet P.

The printing apparatus 1 is provided with the setting interface 123 having a display screen. The setting interface 123 includes, for example, a touch panel, and is configured to execute various settings related to printing of the printing apparatus 1 by a touch operation of a user. The setting interface 123 receives a setting of a size of the sheet P and a setting of whether to perform cutting processing of cutting the sheet P. Information set by the setting interface 123 is output to the controller 100. The cutting processing is an example of dividing processing and is described in detail later.

{Flow of Control by Controller}

Figure 3:
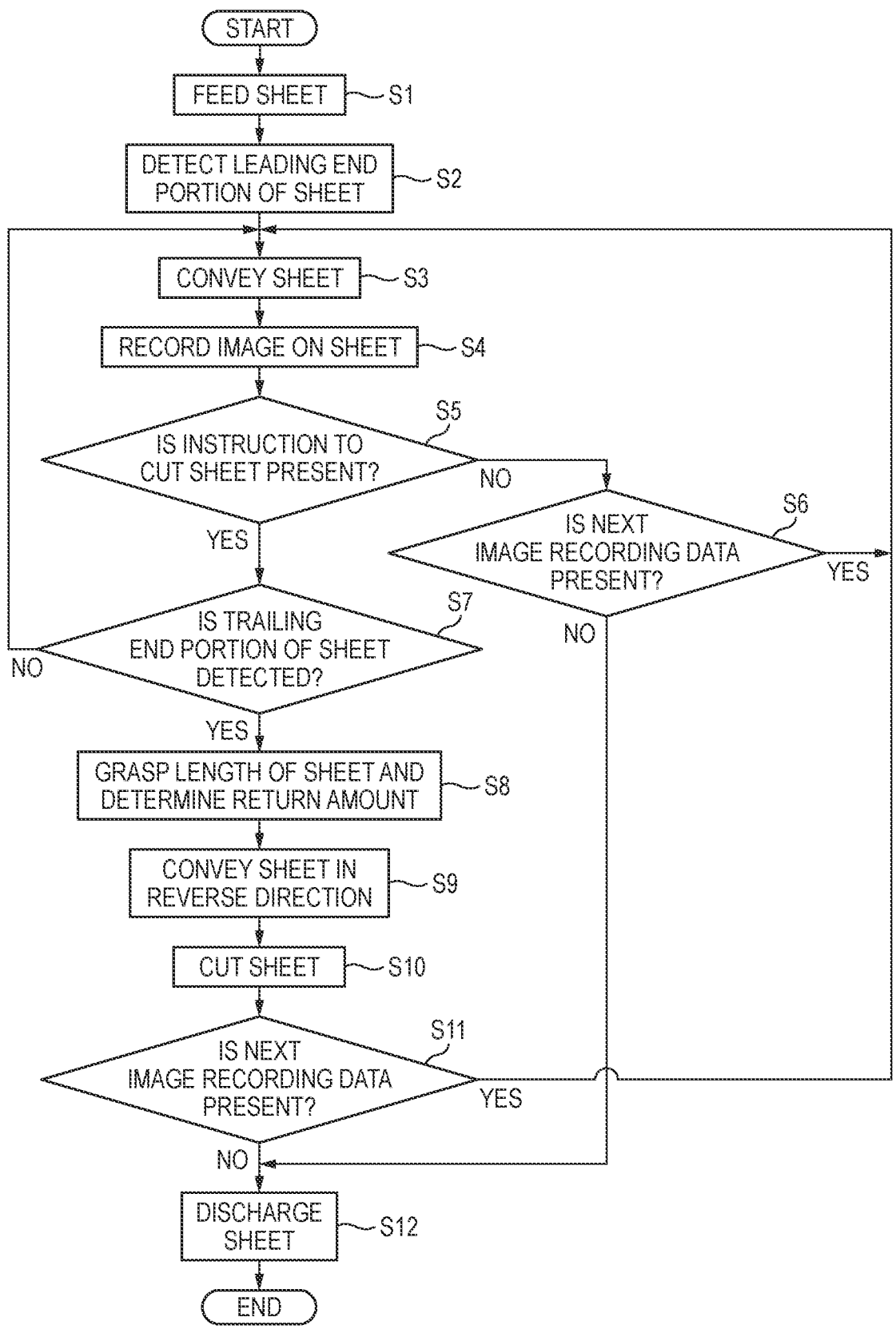
FIG. 3 is a flowchart showing a flow of control performed by a controller included in the printing apparatus shown in FIGS. 1 and 2.
Figure 4B:
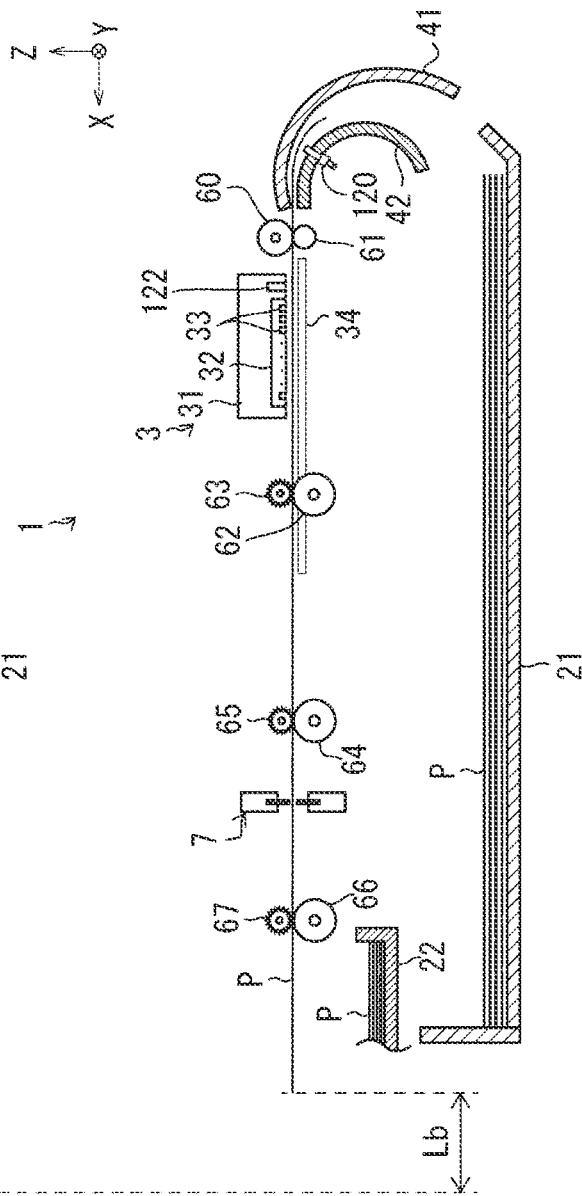

FIG. 3 is a flowchart showing a flow of control by the controller 100 included in the printing apparatus 1 shown in FIGS. 1 and 2. FIGS. 4A and 4B are views showing states of conveyance of the sheet P in the printing apparatus 1 shown in FIGS. 1 and 2. FIGS. 5A and 5B are views showing states in which the sheet P is cut in the printing apparatus 1 shown in FIGS. 1 and 2.

The flowchart shown in FIG. 3 is an example, and the present disclosure is not limited thereto. Some of the members shown in FIG. 1 are omitted in FIGS. 4A to 5B. In the flowchart shown in FIG. 3, it is assumed that power of the printing apparatus 1 is turned on and the controller 100 receives a printing job via the USB interface 110 or the LAN interface 111.

In this case, in step S1, the controller 100 causes the feed motor 107 to rotate the feed roller 23 to feed the sheet P accommodated in the feed tray 21 to the conveyance path R1. When the sheet P is fed by the feed roller 23 and the leading end portion FE of the sheet P reaches the position of the registration sensor 120, the controller 100 detects the leading end portion FE of the sheet P by the registration sensor 120 in step S2.

When the controller 100 detects the leading end portion FE of the sheet P by the registration sensor 120, the controller 100 conveys the sheet P to the position of the image recording device 3 by the conveyance roller 60 in step S3. Next, in step S4, the controller 100 causes the image recording device 3 to record an image of one line on the sheet P.

After the controller 100 causes the image recording device 3 to record the image of one line on the sheet P, the controller 100 determines in step S5 whether an instruction to cut the sheet P is present. In a case of NO in step S5, that is, when the controller 100 determines that no instruction to cut the sheet P is present, the controller 100 determines in step S6 whether next image recording data is present. The next image recording data is data of an image of a line next to the image of one line recorded on the sheet P in step S4 in an image recording range set as a range in which an image is recorded on the sheet P in the printing job.

In a case of YES in step S6, that is, when the controller 100 determines that the next image recording data is present, the processing returns to step S3, and the controller 100 causes the conveyor 6 to convey the sheet P by a predetermined conveyance amount described above. After the controller 100 conveys the sheet P by the predetermined conveyance amount, the processing continues from step S4. In a case of NO in step S6, that is, when the controller 100 determines that no next image recording data is present, the processing proceeds to step S12.

In a case of YES in step S5, that is, when the controller 100 determines that the instruction to cut the sheet P is present, the controller 100 determines in step S7 whether to cause the registration sensor 120 to detect the trailing end portion BE of the sheet P. In a case of NO in step S7, that is, when the controller 100 does not cause the registration sensor 120 to detect the trailing end portion BE of the sheet P, the processing returns to step S3, and the controller 100 causes the conveyor 6 to convey the sheet P by the predetermined conveyance amount.

By repeating the processing of steps S3 to S7, the controller 100 performs image recording processing as processing including processing of recording the image of one line on the sheet P by the image recording device 3 and processing of conveying the sheet P by the predetermined conveyance amount by the conveyor 6.

In a case of YES in step S7, that is, when the controller 100 causes the registration sensor 120 to detect the trailing end portion BE of the sheet P as shown in FIG. 4A, the controller 100 grasps a length Lp of the sheet P and determines a return amount Lb of the sheet P in step S8. The return amount Lb of the sheet P is shown in FIG. 4B.

At this time, the controller 100 grasps the length Lp of the sheet P by causing the registration sensor 120 to detect the trailing end portion BE of the sheet P. Specifically, the controller 100 grasps the length Lp of the sheet P in the conveyance direction D1 based on a conveyance amount of the sheet P detected by the rotary encoder 121 during a period from when the registration sensor 120 detects the leading end portion FE of the sheet P to when the registration sensor 120 detects the trailing end portion BE of the sheet P.

It is assumed that the media sensor 122 detects both the leading end portion FE and the trailing end portion BE of the sheet P. In this case, the controller 100 grasps the length Lp of the sheet P based on a conveyance amount of the sheet P detected by the rotary encoder 121 during a period from when the media sensor 122 detects the leading end portion FE of the sheet P to when the media sensor 122 detects the trailing end portion BE of the sheet P.

The controller 100 performs calculation processing of calculating the cutting position CL of the sheet P based on the grasped length Lp of the sheet P. The cutting position CL is shown in FIG. 5A. For example, when the sheet P is cut into two equal parts by the cutter 7, the controller 100 calculates $Lp/2=148.5$ mm by cutting $Lp=297$ mm into two equal parts. The controller 100 calculates a position located at $Lp/2$ from the leading end portion FE or the trailing end portion BE of the sheet P as the cutting position CL of the sheet P. A method for determining the return amount Lb of the sheet P by the controller 100 is described later.

As described above, the controller 100 grasps the length Lp of the sheet P by causing the registration sensor 120 to detect the trailing end portion BE of the sheet P, and calculates the cutting position CL of the sheet P based on the length Lp of the sheet P. Thereby, even when the size of the sheet P is changed, the cutting position CL of the sheet P can be prevented from being varied. When an A4-size sheet is cut into two equal parts, a distance Ls between the position of the registration sensor 120 and a position of the cutter 7 is shorter than the length Lp/2. When a letter size sheet is cut into two equal parts, the distance Ls is longer than the length Lp/2.

After the controller 100 determines the return amount Lb of the sheet P, the controller 100 performs interruption processing of interrupting the image recording processing by the image recording device 3. Then, in step S9, as shown in FIG. 4B, the controller 100 performs conveyance processing of conveying the sheet P by the conveyor 6 in a reverse direction D2 opposite to the conveyance direction D1 by the return amount Lb. The controller 100 moves the cutting position CL of the sheet P to the position of the cutter 7 by causing the conveyor 6 to convey the sheet P in the reverse direction D2 by the return amount Lb.

After the controller 100 causes the conveyor 6 to convey the sheet P in the reverse direction D2 by the return amount Lb, in step S10, as shown in FIG. 5A, the controller 100 causes the cutter 7 to perform the above-described cutting processing of cutting the sheet P at the cutting position CL. For example, when the sheet P is cut into two equal parts by the cutter 7, the sheet P is cut into a first sheet P1 and a second sheet P2. When the sheet P is of A4 size, the first sheet P1 and the second sheet P2 of A5 size are generated. As shown in FIG. 5B, the second sheet P2 is conveyed prior to the first sheet P1 in the conveyance path R1.

As in steps S8 to S10, after the length Lp of the sheet P is grasped, cutting processing of cutting the sheet P is performed by conveying the sheet P in the reverse direction D2 opposite to the conveyance direction D1. Therefore, a distance between the position of the cutter 7 and a detection position of the trailing end portion BE of the sheet P detected by the registration sensor 120 can be reduced as compared with a case where cutting processing of cutting the sheet P is performed without conveying the sheet P in the reverse direction D2 opposite to the conveyance direction D1. Thereby, a size of the printing apparatus 1 can be reduced.

It is assumed that there is provided a double-sided conveyance path that is separated from the conveyance path R1 in vicinity of the conveyance roller 66 and joins the conveyance path R1 at the conveyance start position V. In this configuration, time required for recording the image can be shortened as compared with a case where the sheet P passes through the double-sided conveyance path, a length of the sheet P is grasped, and then an image is recorded on the sheet P.

After the controller 100 causes the cutter 7 to cut the sheet P, the controller 100 determines a remaining conveyance amount Lf of the sheet P prior to the processing of step S11. A method for determining the remaining conveyance amount Lf of the sheet P by the controller 100 is described later. After determining the remaining conveyance amount Lf of the sheet P, the controller 100 causes the conveyor 6 to convey the sheet P in the conveyance direction D1 by the remaining conveyance amount Lf. Thereby, the sheet P returns to a position before the sheet P is conveyed in the reverse direction D2.

After the controller 100 causes the conveyor 6 to convey the sheet P in the conveyance direction D1 by the remaining conveyance amount Lf, the controller 100 determines in step S11 whether next image recording data is present. The processing of step S11 is the same as the processing of step S6.

In a case of YES in step S11, that is, when the controller 100 determines that the next image recording data is present, the processing returns to step S3, and the processing of step S4 is performed again. That is, after the cutting processing of step S10, the controller 100 causes the image recording device 3 to perform restart processing of restarting the image recording processing of steps S3 to S7 interrupted in the interruption processing performed prior to step S9 on the sheet P cut in the cutting processing. In the restart processing, the controller 100 records an image on a remaining portion of the image recording range of the sheet P.

Thereby, even when the cutting processing of cutting the sheet P is performed by conveying the sheet P in the reverse direction D2 opposite to the conveyance direction D1, an image can be recorded on the entire image recording range of the sheet P. Therefore, both reduction of the size of the printing apparatus 1 and recording of the image on the entire image recording range of the sheet P can be achieved.

In a case of NO in step S11, that is, when the controller 100 determines that no next image recording data is present, the controller 100 causes the conveyor 6 to discharge the first sheet P1 to the discharge tray 22 in step S12.

{Method for Determining Return Amount of Sheet}

Figure 6:
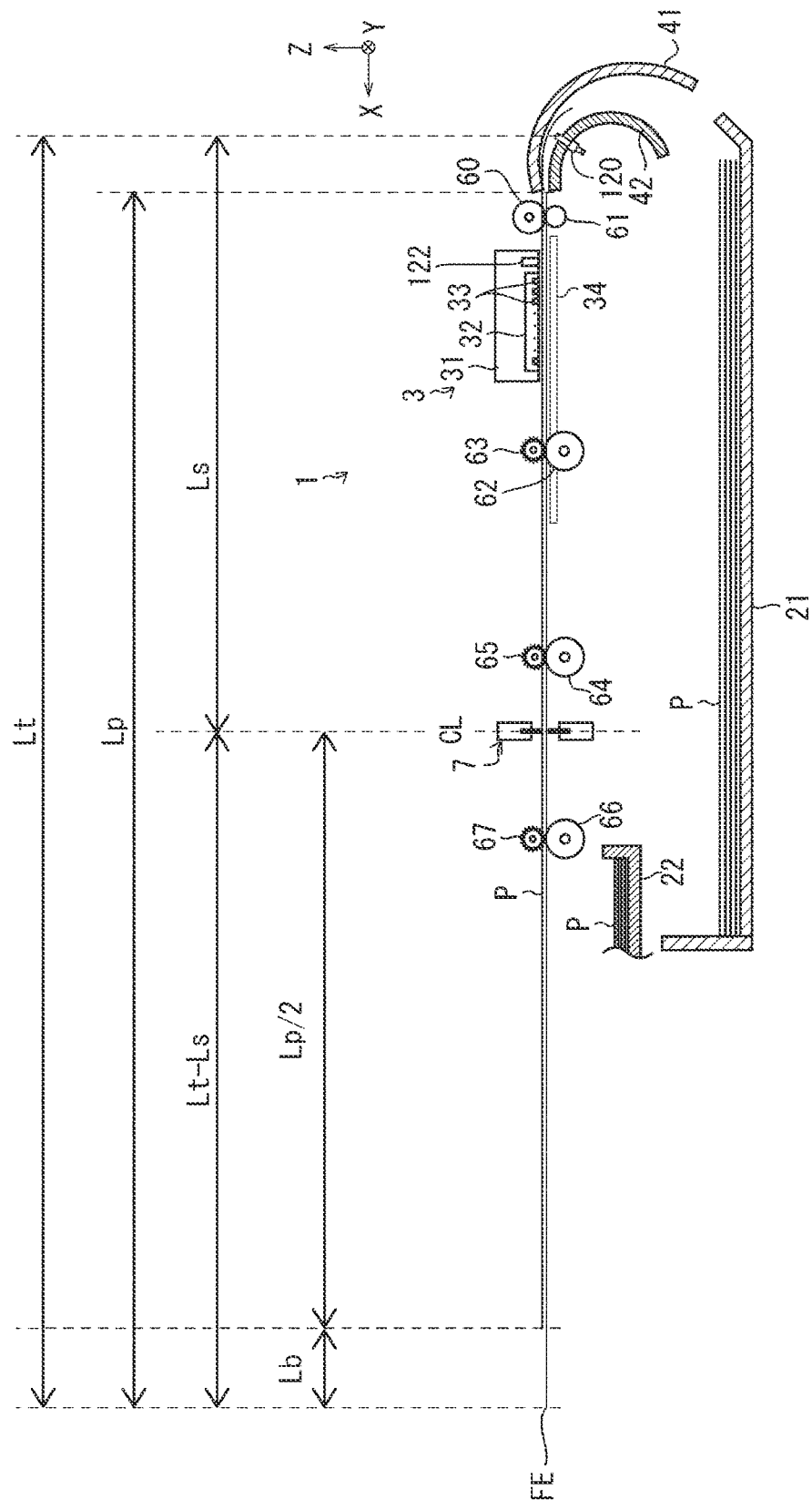
FIG. 6 is a view for explaining a method for determining a return amount of the sheet by the controller included in the printing apparatus shown in FIGS. 1 and 2.

FIG. 6 is a view for explaining a method for determining the return amount Lb of the sheet P by the controller 100 included in the printing apparatus 1 shown in FIGS. 1 and 2. In FIG. 6, for convenience of description, two sheets P are shown in a stacked manner. Some of the members shown in FIG. 1 are omitted in FIG. 6. The upper sheet P indicates the sheet P after being conveyed in the reverse direction D2, and the lower sheet P indicates the sheet P before being conveyed in the reverse direction D2. The controller 100 determines the return amount Lb of the sheet P based on the length Lp of the sheet P, a cumulative conveyance amount Lt of the sheet P after the registration sensor 120 detects the leading end portion FE of the sheet P, and the distance Ls between the position of the registration sensor 120 and the position of the cutter 7.

Specifically, the controller 100 grasps, as the cumulative conveyance amount Lt, the conveyance amount of the sheet P detected by the rotary encoder 121 after the registration sensor 120 detects the leading end portion FE of the sheet P. The controller 100 grasps the distance Ls based on information stored in the ROM 102 or the EEPROM 104. The controller 100 determines the return amount Lb of the sheet P by the following equation (1). The return amount Lb is a difference between a distance Lt−Ls between the leading end portion FE of the sheet P and the position of the cutter 7 before the sheet P is conveyed in the reverse direction D2, and half Lp/2 of the length of the sheet P.

$$Lb = Lt - Ls - Lp/2 \qquad (1)$$

{Method for Determining Remaining Conveyance Amount of Sheet}

Figure 7:
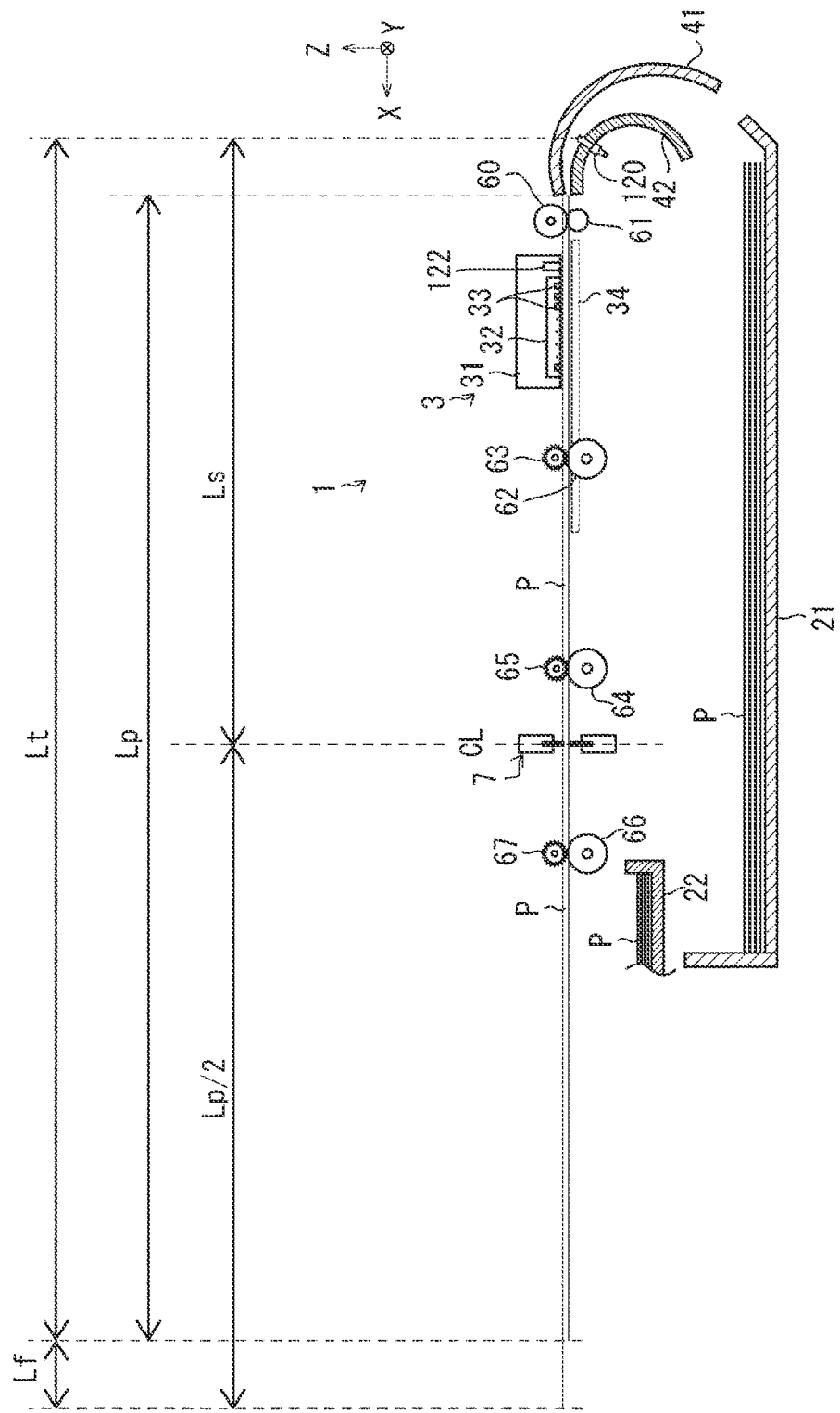
FIG. 7 is a view for explaining a method of determining a remaining conveyance amount of the sheet by the controller included in the printing apparatus shown in FIGS. 1 and 2.

FIG. 7 is a view for explaining a method of determining the remaining conveyance amount Lf of the sheet P by the controller 100 included in the printing apparatus 1 shown in FIGS. 1 and 2. In FIG. 7, for convenience of description, two sheets P are shown in a stacked manner. Some of the members shown in FIG. 1 are omitted in FIG. 7. The upper sheet P indicates the sheet P after being conveyed in the conveyance direction D1, and the lower sheet P indicates the sheet P before being conveyed in the transport direction D1. The controller 100 determines the remaining conveyance amount Lf of the sheet P by the following equation (2). The remaining conveyance amount Lf is a value obtained by reversing positive and negative of the return amount Lb.

$$Lf = Ls + Lp/2 - Lt \quad (2)$$

{Modification 1}

In the printing apparatus 1 described above, the sheet P is cut by the cutter 7 to divide the sheet P into a plurality of parts, but the present disclosure is not limited thereto. Instead of the cutter 7, the printing apparatus 1 may include a machining device that performs perforation forming on the sheet P as an example of a divider. In this case, the controller 100 causes the machining device to perform machining processing of performing the perforation forming on the sheet P at a machining position serving as an example of a dividing position of the sheet P. The machining position is a position the same as the cutting position CL.

Specifically, the machining device includes a perforation cutter in which blades are formed at equal intervals on a circumference of a disk, and the above-described cutter carriage. The machining device forms perforations in the sheet P by moving the cutter carriage in the width direction of the sheet P and forming a plurality of cuts at intervals along the machining position of the sheet P by the perforation cutter.

{Modification 2}

Figure 8A:
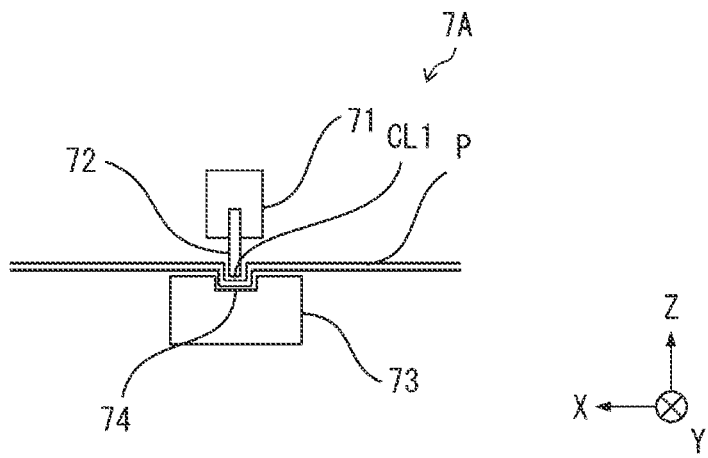
FIGS. 8A and 8B are views showing configurations of machining devices serving as a modification of a cutter included in the printing apparatus shown in FIGS. 1 and 2.

FIG. 8 are views showing configurations of machining devices 7A and 7B serving as a modification of the cutter 7 included in the printing apparatus 1 shown in FIGS. 1 and 2. Instead of the cutter 7, the printing apparatus 1 may include a machining device 7A that performs fold forming on the sheet P as shown in FIG. 8A as an example of a divider. In this case, the controller 100 causes the machining device 7A to perform machining processing of performing the fold forming on the sheet P at a machining position CL1 of the sheet P.

The machining device 7A includes a cutter carriage 71, a blade 72, and a holding member 73. The blade 72 is a round blade and is provided on the cutter carriage 71. The blade 72 is formed to such an extent that the sheet P is not cut even when the blade 72 is in contact with the sheet P. A recess 74 is formed in the holding member 73, and the recess 74 is disposed at a position facing the blade 72. The machining device 7A moves the cutter carriage 71 in the width direction of the sheet P to press the sheet P against the recess 74 by the blade 72. Thereby, a fold is formed along the machining position CL1 of the sheet P.

Figure 8B:
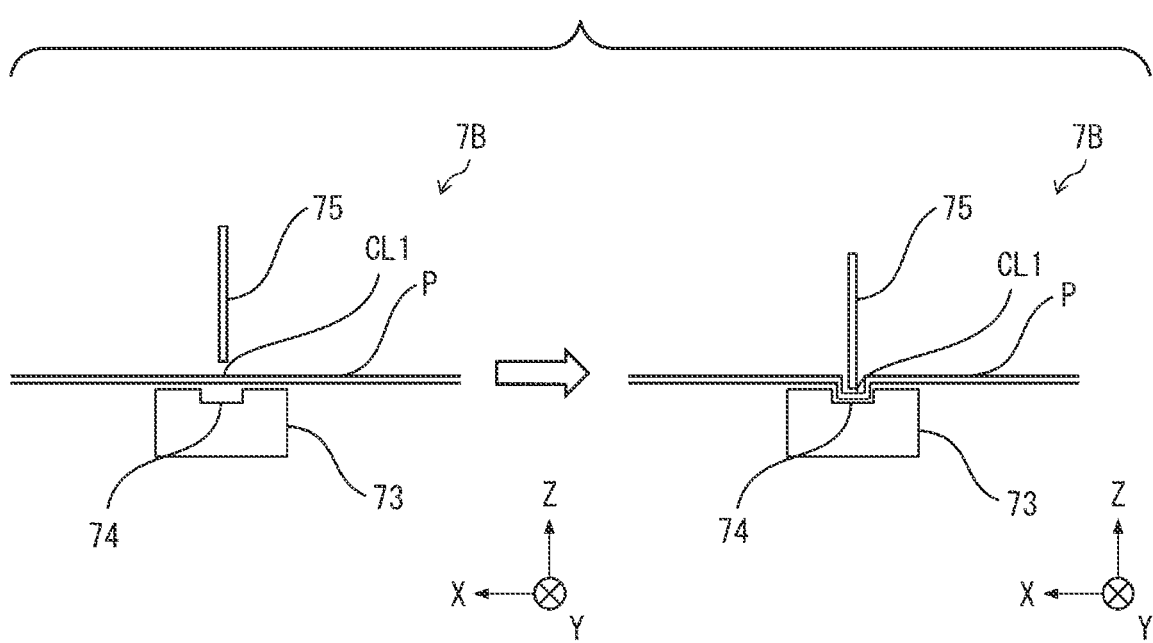

Instead of the cutter 7, the printing apparatus 1 may include a machining device 7B shown in FIG. 8B as an example of a divider. The machining device 7B includes the holding member 73 and a push-out member 75. The push-out member 75 is for pushing out the sheet P in a negative direction of Z at the machining position CL1, and is, for example, a rectangular blade that extends in the Y direction and is formed to such an extent that the sheet P is not cut even when the blade is in contact with the sheet P. The recess 74 formed in the holding member 73 is disposed at a position facing the push-out member 75.

The machining device 7B moves the push-out member 75 in the negative direction of Z to bring the push-out member 75 into contact with the machining position CL1 of the sheet P and push out the sheet P in the negative direction of Z at the machining position CL1. The machining device 7B forms a fold at the machining position CL1 of the sheet P by holding the sheet P pushed out by the push-out member 75 with the recess 74 of the holding member 73.

{Modification 3}

The controller 100 may perform the following processing between steps S7 and S8. Specifically, the controller 100 may perform determination processing of determining whether to interrupt the image recording processing of steps S3 to S7 based on the image recorded on the sheet P by the image recording device 3. When the controller 100 determines to interrupt the image recording processing in the determination processing, the processing proceeds to step S8.

When the controller 100 determines not to interrupt the image recording processing in the determination processing, the controller 100 performs the processing of step S11 prior to the processing of step S8, and does not perform the processing of step S11 after the processing of step S10. In this configuration, in a case of NO in step S11, the processing proceeds to step S8, and the controller 100 determines in step S8 the return amount Lb of the sheet P by the following equation (3).

$$Lb = Lt - Ls \quad (3)$$

Thereby, after the entire image is recorded on the sheet P without interrupting the image recording process, the sheet P is conveyed in the reverse direction D2 by the conveyor 6 in step S9, and the sheet P is cut by the cutter 7 in step S10.

As described above, when the image recording process is interrupted and the conveyance processing and the cutting processing described above are performed, the conveyance processing and the cutting processing are performed before the entire image is recorded on the sheet P. Therefore, the conveyance amount in the reverse direction D2 opposite to the conveyance direction D1 is prevented, and processing time can be shortened. On the other hand, when the conveyance processing and the cutting processing are performed without interrupting the image recording processing, the image recorded on the sheet P can be prevented from being interrupted, and the image can be clearly recorded on the sheet P. By performing the determination processing of determining whether to interrupt the image recording processing, the controller 100 can determine whether to prioritize shortening of the processing time or sharpness of the image according to the image.

In the determination processing, for example, the controller 100 may grasp the image recorded on the sheet P based on the data of the image included in the printing job, and determine whether one line of the image of a portion corresponding to the cutting position CL of the sheet P is blank. When the controller 100 determines that one line of the image of the portion corresponding to the cutting position CL of the sheet P is blank, the controller 100 determines to interrupt the image recording processing in the determination processing. When the controller 100 determines that one line of the image of the portion corresponding to the cutting position CL of the sheet P is not blank, the controller 100 determines not to interrupt the image recording processing in the determination processing.

When one line of the image of the portion corresponding to the cutting position CL of the sheet P is blank, the sharpness of the image recorded on the sheet P is not affected even if the image recording processing is interrupted. In contrast, when one line of the image of the portion corresponding to the cutting position CL of the sheet P is not blank, the sharpness of the image recorded on the sheet P can be prioritized by not interrupting the image recording processing.

Further, in the determination processing, for example, the controller 100 may determine whether to interrupt the image recording processing according to a setting made by the user through the setting interface 123. In this case, the user can select whether to interrupt the image recording processing using the setting interface 123. When interruption of the image recording processing is selected in the setting interface 123, the controller 100 determines to interrupt the image recording processing in the determination processing. When the interruption of the image recording processing is not set in the setting interface 123, the controller 100 determines not to interrupt the image recording processing in the determination processing.

In the determination processing, for example, the controller 100 may determine whether to interrupt the image recording processing based on a type of the sheet P. When the type of the sheet P is plain paper, the controller 100 determines to interrupt the image recording processing in the determination processing, and when the type of the sheet P is glossy paper, the controller 100 determines not to interrupt the image recording processing in the determination processing.

Second Illustrative Embodiment

Figure 9:
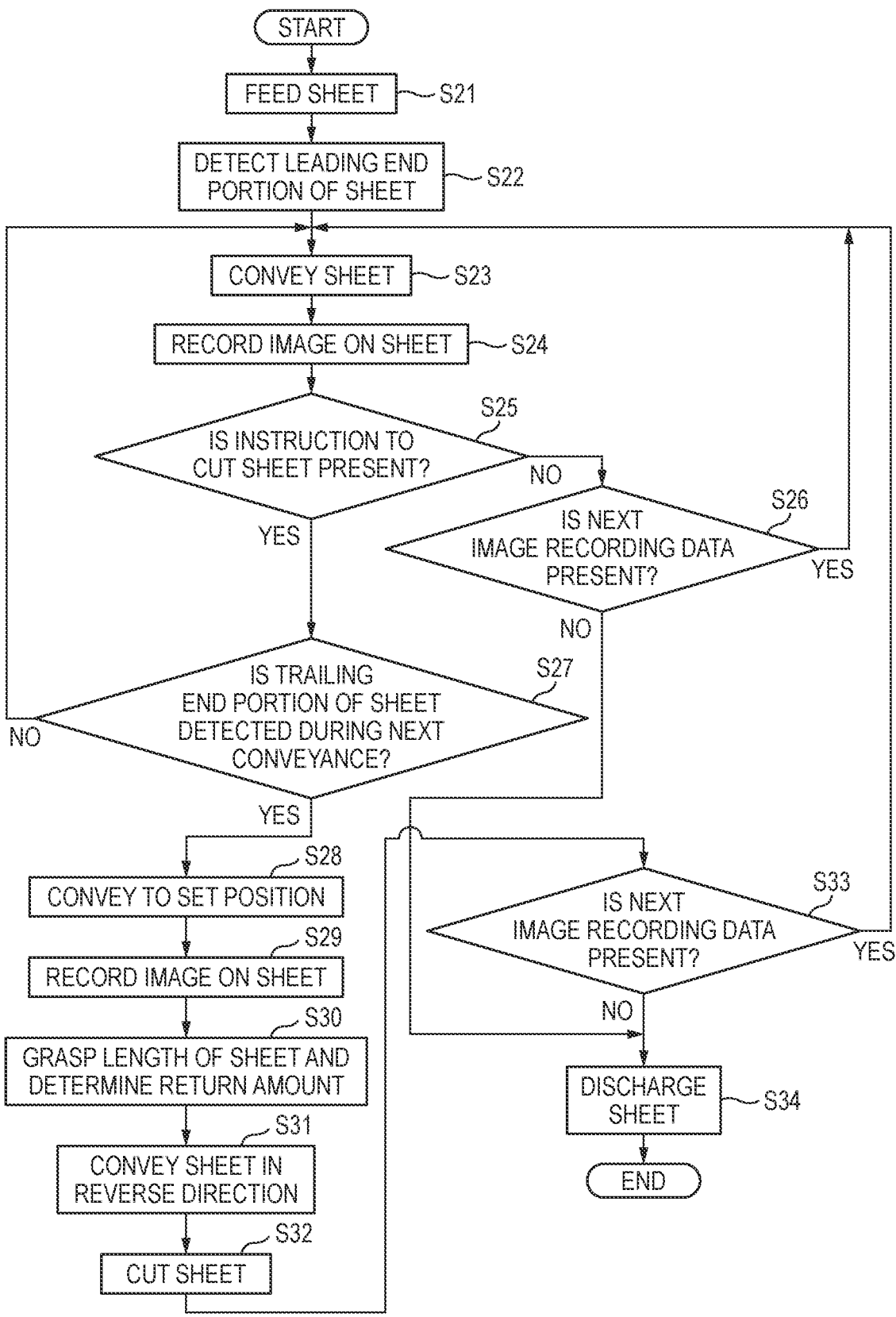
FIG. 9 is a flowchart showing a flow of control performed by a controller included in a printing apparatus according to a second illustrative embodiment of the present disclosure.

A second illustrative embodiment of the present disclosure is described below. For convenience of description, members having functions the same as those described in the first illustrative embodiment are denoted by the same reference numerals, and description thereof is not repeated. FIG. 9 is a flowchart showing a flow of control performed by the controller 100 included in the printing apparatus 1 according to the second illustrative embodiment of the present disclosure.

In the flowchart shown in FIG. 9, the processing of steps S21 to S26 are the same as the processing of steps S1 to S6 shown in FIG. 3, respectively. It is assumed a case of YES in step S25, that is, when the controller 100 determines that an instruction to cut the sheet P is present.

In this case, in step S27, the controller 100 determines whether to cause the registration sensor 120 to detect the trailing end portion BE of the sheet P when the sheet P is conveyed by the predetermined conveyance amount. Specifically, the controller 100 determines whether a value obtained by adding the predetermined conveyance amount to a current cumulative conveyance amount Lt in the above-described cumulative conveyance amount Lt is equal to or greater than a predetermined threshold value. The predetermined threshold value is the length of the sheet P set in the printing job.

In a case of NO in step S27, that is, when the controller 100 determines not to detect the trailing end portion BE of the sheet P, the processing returns to step S23. At this time, in step S23, the controller 100 causes the conveyor 6 to convey the sheet P by the predetermined conveyance amount.

It is assumed a case of YES in step S27, that is, when the controller 100 determines to detect the trailing end portion BE of the sheet P. In this case, in step S28, the controller 100 conveys the sheet P to a set position. The set position is a position of the sheet P when the cumulative conveyance amount Lt reaches the predetermined threshold value. At this time, the registration sensor 120 detects the trailing end portion BE of the sheet P, and the controller 100 determines that the registration sensor 120 detects the trailing end portion BE of the sheet P. Then, the controller 100 performs stop processing of stopping conveyance of the sheet P by the conveyor 6.

In other words, when the cumulative conveyance amount Lt as the conveyance amount of the sheet P in the conveyance direction D1 by the conveyor 6 reaches the predetermined threshold value, the controller 100 performs the stop processing of stopping the conveyance of the sheet P by the conveyor 6. The predetermined threshold value is an upper limit value of the cumulative conveyance amount Lt at which a state in which the sheet P is nipped between the conveyance roller 60 and the pinch roller 61 is maintained. Thereby, the state in which the sheet P is nipped between the conveyance roller 60 and the pinch roller 61 can be maintained, whereby a conveyance accuracy of the sheet P can be improved and occurrence of a jam can be prevented.

While conveying the sheet P to the set position, the controller 100 causes the image recording device 3 to record an image on the sheet P in step S29. The processing of step S29 is the same as the image recording processing of steps S3 to S7 shown in FIG. 3. The processing of steps S30 to S34 are the same as the processing of steps S8 to S12 shown in FIG. 3, respectively.

Third Illustrative Embodiment

Figure 10:
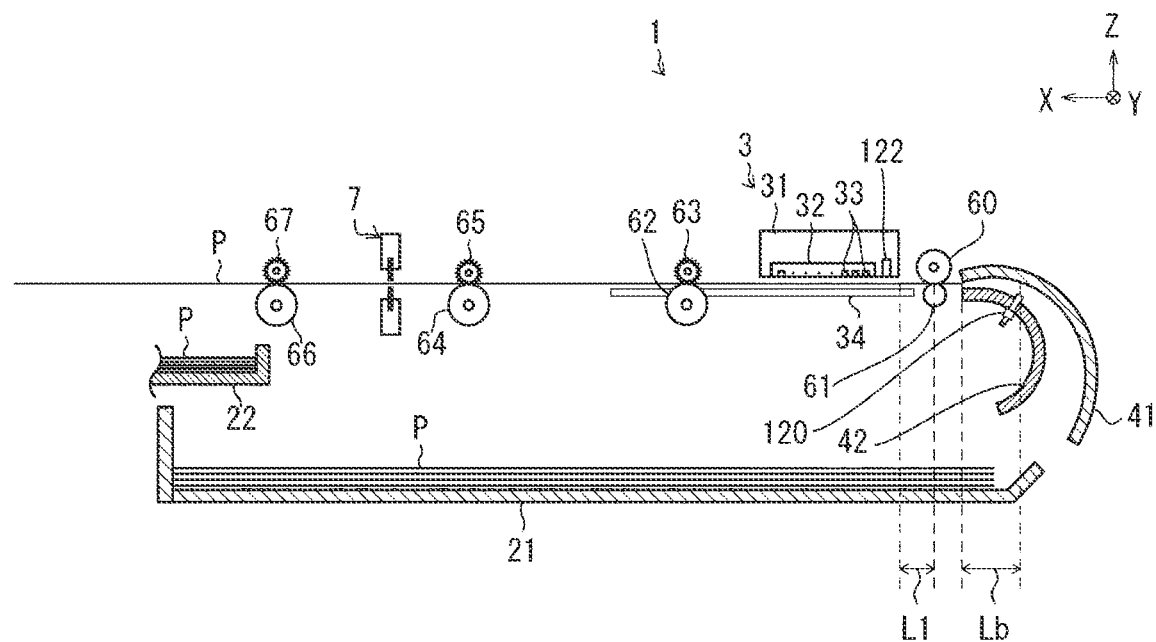
FIG. 10 is a view showing control performed by a controller included in a printing apparatus according to a third illustrative embodiment of the present disclosure.
Figure 11:
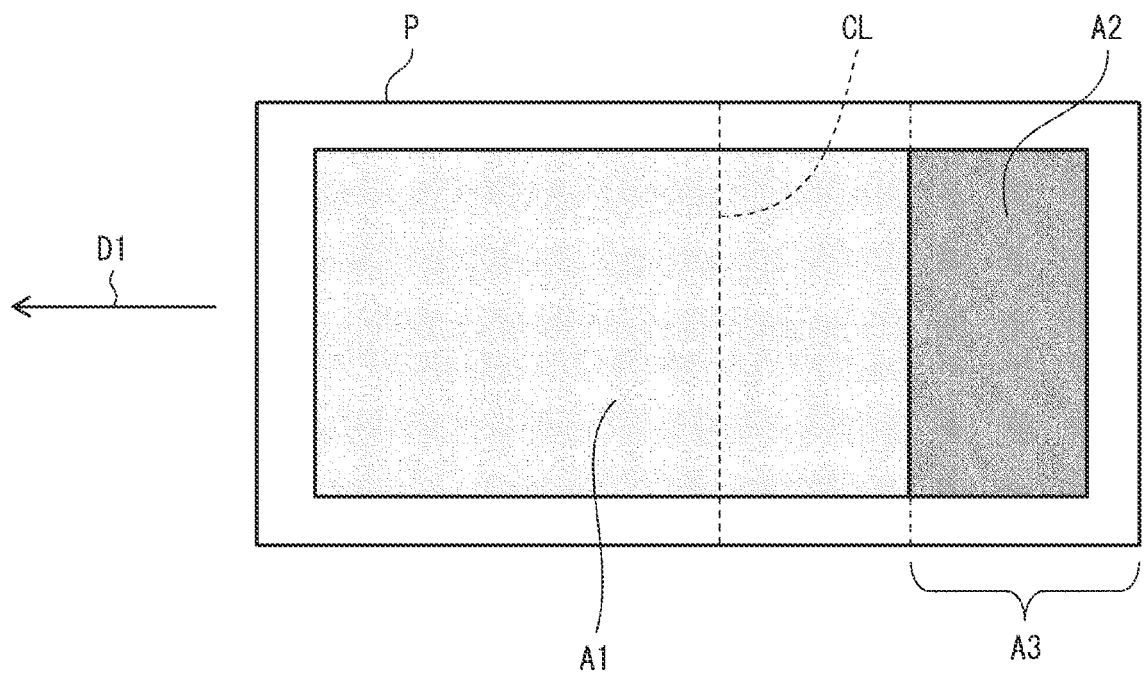
FIG. 11 is a view showing a sheet conveyed by the printing apparatus shown in FIG. 10.

A third illustrative embodiment of the present disclosure is described below. For convenience of description, members having functions the same as those described in the first and second illustrative embodiments are denoted by the same reference numerals, and description thereof is not repeated. FIG. 10 is a view showing control performed by the controller 100 included in the printing apparatus 1 according to the third illustrative embodiment of the present disclosure. FIG. 11 is a view showing the sheet P conveyed by the printing apparatus 1 shown in FIG. 10. Some of the members shown in FIG. 1 are omitted in FIG. 10.

In the third illustrative embodiment, in step S29 of the flowchart shown in FIG. 9, the controller 100 performs first image recording processing of recording an image on a first area A1 of the sheet P by the image recording device 3. The first area A1 of the sheet P is shown in FIG. 11. The first image recording processing is processing of recording the image on the first area A1 of the sheet P by a method the same as that of the image recording processing of steps S3 to S7 shown in FIG. 3.

It is assumed a case of YES in step S33, that is, when the controller 100 determines that next image recording data is present, after the cutting processing of step S32 shown in FIG. 9. In this case, in steps S23 to S27, the controller 100 performs second image recording processing of recording an image on a second area A2 included in an area of the sheet P other than the first area A1 by the image recording device 3. The second image recording processing is processing of recording the image on the second area A2 of the sheet P by a method the same as that of the image recording process of steps S3 to S7 shown in FIG. 3.

The first area A1 and the second area A2 configure an image recording range of the sheet P described in the first illustrative embodiment. The first area A1 is included in an area other than a nipping area A3 when the above-described conveyance processing of step S30 is performed by the controller 100. The nipping area A3 is an area of the sheet P that is nipped by the conveyance roller 60 and the pinch roller 61.

Since the first area A1 is included in the area of the sheet P other than the nipping area A3, the conveyance roller 60 and the pinch roller 61 can be prevented from nipping the first area A1, and the conveyance roller 60 and the pinch roller 61 can be prevented from being contaminated.

The first area A1 is included in the area other than the nipping area A3 even when the return amount Lb determined in step S30 reaches a maximum value estimated in advance. In FIG. 10, a distance between an end portion of the image recording device 3 on a negative direction side of X and a position of a rotation axis of the conveyance roller 60 is L1. In this case, the first area A1 is the area that satisfies a condition of L1>Lb.

The present invention is not limited to the above-described illustrative embodiments, and various modifications can be made within the scope of disclosure. The technical scope of the present invention also includes illustrative embodiments obtained by appropriately combining the technical means disclosed in the different illustrative embodiments.

What is claimed is:

1. A printing apparatus comprising:
    a conveyor configured to convey a printing medium;
    an image recording device configured to record an image on the printing medium conveyed in a conveyance direction by the conveyor;
    a divider provided downstream of the image recording device in the conveyance direction, the divider being configured to divide the printing medium having the image recorded thereon by the image recording device and being conveyed by the conveyor;
    a detector provided upstream of the divider in the conveyance direction, the detector being configured to detect a trailing end portion of the printing medium; and
    a controller configured to cause the printing apparatus to:
        calculate a dividing position of the printing medium based on a length of the printing medium, the length of the printing medium being grasped by detecting the trailing end portion by the detector;
        after the calculating, convey the printing medium in a reverse direction by the conveyor to move the dividing position to a position of the divider, the reverse direction being opposite to the conveyance direction by the conveyor; and
        after the conveying, divide the printing medium at the dividing position by the divider.

2. The printing apparatus according to claim 1,
    wherein the conveyor comprises a conveyance roller pair provided upstream of the image recording device in the conveyance direction, the conveyance roller pair being configured to convey the printing medium,
    wherein the controller is further configured to cause the printing apparatus to:
        in a case the trailing end portion is detected by the detector, based on a conveyance amount of the printing medium in the conveyance direction by the conveyor reaching a predetermined threshold value, stop the conveyance of the printing medium by the conveyor and perform the conveying after the stopping of the conveyance of the printing medium, and
    wherein the predetermined threshold value is an upper limit value of the conveyance amount at which a state in which the printing medium is nipped between the conveyance roller pair is maintained.

3. The printing apparatus according to claim 2,
    wherein the controller is further configured to cause the printing apparatus to:
        record an image in a first area of the printing medium by the image recording device; and
        after the dividing, record an image in a second area of the printing medium by the image recording device, the second area being other than the first area, and
    wherein the first area is included in an area of the printing medium other than a third area that is nipped by the conveyance roller pair in a case the controller performs the conveying.

4. The printing apparatus according to claim 1, wherein the controller is further configured to cause the printing apparatus to:
    determine whether to interrupt recording of the image on the printing medium by the image recording device, the recording being to be performed prior to the conveying and the dividing, based on the image recorded on the printing medium by the image recording device.

5. The printing apparatus according to claim 1,
    wherein the controller is further configured to cause the printing apparatus to:
        record the image on the printing medium by the image recording device, the recording being to be performed prior to the conveying and the dividing;
        interrupt the recording that is to be performed prior to the conveying and the dividing; and
        after the dividing, restart the recording interrupted to record the image in a remaining portion of an image recording range of the printing medium.

6. A printing apparatus comprising:
    a conveyor configured to convey a printing medium;
    an image recording device configured to record an image on the printing medium conveyed in a conveyance direction by the conveyor;
    a machining device provided downstream of the image recording device in the conveyance direction, the machining device being configured to perform one of (i) cutting, (ii) perforation forming, and (iii) fold forming on the printing medium having the image recorded thereon by the image recording device and being conveyed by the conveyor;
    a detector provided upstream of the machining device in the conveyance direction, the detector being configured to detect a trailing end portion of the printing medium; and
    a controller configured to cause the printing apparatus to:
        calculate a machining position of the printing medium based on a length of the printing medium, the length of the printing medium being grasped by detecting the trailing end portion by the detector;
        after the calculating, convey the printing medium in a reverse direction by the conveyor to move the machining position to a position of the machining device, the reverse direction being opposite to the conveyance direction by the conveyor; and
        after the conveying, perform one of the (i) cutting, (ii) perforation forming, and (iii) fold forming on the printing medium at the machining position on the printing medium by the machining device.

7. The printing apparatus according to claim 6,
    wherein the conveyor comprises a conveyance roller pair provided upstream of the image recording device in the conveyance direction, the conveyance roller pair being configured to convey the printing medium,
    wherein the controller is further configured to cause the printing apparatus to:
        in a case the trailing end portion is detected by the detector, based on a conveyance amount of the printing medium in the conveyance direction by the conveyor reaching a predetermined threshold value, stop the conveyance of the printing medium by the conveyor and perform the conveying after the stopping of the conveyance of the printing medium, and wherein the predetermined threshold value is an upper limit value of the conveyance amount at which a state in which the printing medium is nipped between the conveyance roller pair is maintained.

8. The printing apparatus according to claim 7, wherein the controller is further configured to cause the printing apparatus to:

record an image in a first area of the printing medium by the image recording device; and after the performing of one of the (i) cutting, (ii) perforation forming, and (iii) fold forming, record an image in a second area of the printing medium by the image recording device, the second area being other than the first area, and wherein the first area is included in an area of the printing medium other than a third area that is nipped by the conveyance roller pair in a case the controller performs the conveying.

9. The printing apparatus according to claim 6, wherein the controller is further configured to cause the printing apparatus to:

determine whether to interrupt recording of the image on the printing medium by the image recording device, the recording being to be performed prior to the conveying and the performing of one of the (i) cutting, (ii) perforation forming, and (iii) fold forming, based on the image recorded on the printing medium by the image recording device.

10. The printing apparatus according to claim 6, wherein the controller is further configured to cause the printing apparatus to:

record the image on the printing medium by the image recording device, the recording being to be performed prior to the conveying and the performing of one of the (i) cutting, (ii) perforation forming, and (iii) fold forming;

interrupt the recording that is to be performed prior to the conveying and the performing of one of the (i) cutting, (ii) perforation forming, and (iii) fold forming; and after the performing of one of the (i) cutting, (ii) perforation forming, and (iii) fold forming, restart the recording interrupted to record the image in a remaining portion of an image recording range of the printing medium.

11. A method for controlling a printing apparatus, the printing apparatus comprising:

a conveyor configured to convey a printing medium;

an image recording device configured to record an image on the printing medium conveyed in a conveyance direction by the conveyor;

a divider provided downstream of the image recording device in the conveyance direction, the divider being configured to divide the printing medium having the image recorded thereon by the image recording device and being conveyed by the conveyor;

a detector provided upstream of the divider in the conveyance direction, the detector being configured to detect a trailing end portion of the printing medium; and a controller, the method comprising:

calculating a dividing position of the printing medium based on a length of the printing medium, the length of the printing medium being grasped by detecting the trailing end portion by the detector;

after the calculating, conveying the printing medium in a reverse direction by the conveyor to move the dividing position to a position of the divider; and after the conveying, dividing the printing medium at the dividing position by the divider.

12. The method according to claim 11, wherein the conveyor comprises a conveyance roller pair provided upstream of the image recording device in the conveyance direction, the conveyance roller pair being configured to convey the printing medium, wherein the method further comprises:

in a case the trailing end portion is detected by the detector, based on a conveyance amount of the printing medium in the conveyance direction by the conveyor reaching a predetermined threshold value, stopping the conveyance of the printing medium by the conveyor and performing the conveying after the stopping of the conveyance of the printing medium, and wherein the predetermined threshold value is an upper limit value of the conveyance amount at which a state in which the printing medium is nipped between the conveyance roller pair is maintained.

13. The method according to claim 12, further comprising:

recording an image in a first area of the printing medium by the image recording device; and after the dividing, recording an image in a second area of the printing medium by the image recording device, the second area being other than the first area, wherein the first area is included in an area of the printing medium other than a third area that is nipped by the conveyance roller pair in a case of performing the conveying.

14. The method according to claim 11, further comprising:

determining whether to interrupt recording of the image on the printing medium by the image recording device, the recording being to be performed prior to the conveying and the dividing, based on the image recorded on the printing medium by the image recording device.

15. The method according to claim 11, further comprising:

recording the image on the printing medium by the image recording device, the recording being to be performed prior to the conveying and the dividing;

interrupting the recording that is to be performed prior to the conveying and the dividing; and after the dividing, restarting the recording interrupted to record the image in a remaining portion of an image recording range of the printing medium.

16. A method for controlling a printing apparatus, the printing apparatus comprising:

a conveyor configured to convey a printing medium;

an image recording device configured to record an image on the printing medium conveyed in a conveyance direction by the conveyor;

a machining device provided downstream of the image recording device in the conveyance direction, the machining device being configured to perform one of (i) cutting, (ii) perforation forming, and (iii) fold forming on the printing medium having the image recorded thereon by the image recording device and being conveyed by the conveyor;

a detector provided upstream of the machining device in the conveyance direction, the detector being configured to detect a trailing end portion of the printing medium; and a controller, the method comprising:

calculating a machining position of the printing medium based on a length of the printing medium, the length of the printing medium being grasped by detecting the trailing end portion by the detector;

after the calculating, conveying the printing medium in a reverse direction by the conveyor to move the machining position to a position of the machining device, the reverse direction being opposite to the conveyance direction; and after the conveying, performing one of the (i) cutting, (ii) perforation forming, and (iii) fold forming on the printing medium at the machining position on the printing medium by the machining device.

17. The method according to claim 16, wherein the conveyor comprises a conveyance roller pair provided upstream of the image recording device in the conveyance direction, the conveyance roller pair being configured to convey the printing medium, wherein the method further comprises:

in a case the trailing end portion is detected by the detector, based on a conveyance amount of the printing medium in the conveyance direction by the conveyor reaching a predetermined threshold value, stopping the conveyance of the printing medium by the conveyor and performing the conveying after the stopping of the conveyance of the printing medium, and wherein the predetermined threshold value is an upper limit value of the conveyance amount at which a state in which the printing medium is nipped between the conveyance roller pair is maintained.

18. The method according to claim 17, further comprising:

recording an image in a first area of the printing medium by the image recording device; and after the performing of one of the (i) cutting, (ii) perforation forming, and (iii) fold forming, recording an image in a second area of the printing medium by the image recording device, the second area being other than the first area, wherein the first area is included in an area of the printing medium other than a third area that is nipped by the conveyance roller pair in a case of performing the conveying.

19. The method according to claim 16, further comprising:

determining whether to interrupt recording of the image on the printing medium by the image recording device, the recording being to be performed prior to the conveying and the performing of one of the (i) cutting, (ii) perforation forming, and (iii) fold forming, based on the image recorded on the printing medium by the image recording device.

20. The printing apparatus according to claim 16, further comprising:

recording the image on the printing medium by the image recording device, the recording being to be performed prior to the conveying and the performing of one of the (i) cutting, (ii) perforation forming, and (iii) fold forming;

interrupting the recording that is to be performed prior to the conveying and the performing of one of the (i) cutting, (ii) perforation forming, and (iii) fold forming; and after the performing of one of the (i) cutting, (ii) perforation forming, and (iii) fold forming, restarting the recording interrupted to record the image in a remaining portion of an image recording range of the printing medium.

* * * * *